Jan. 28, 1930.  D. JOHNSTON  1,744,901
ANIMAL TRAP
Filed May 13, 1929   2 Sheets-Sheet 1
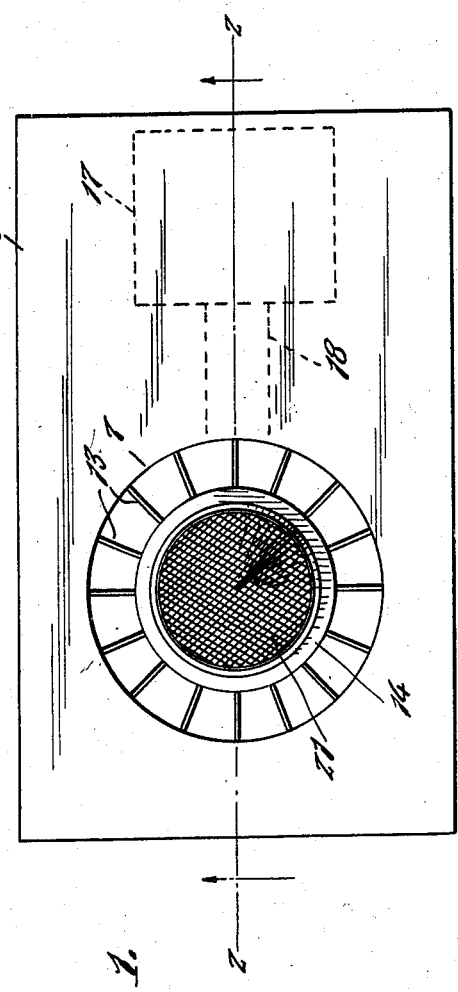
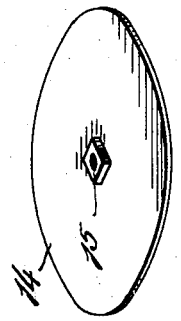
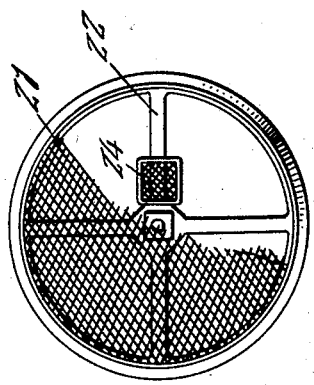
Inventor
Dick Johnston
By Clarence A. O'Brien
Attorney

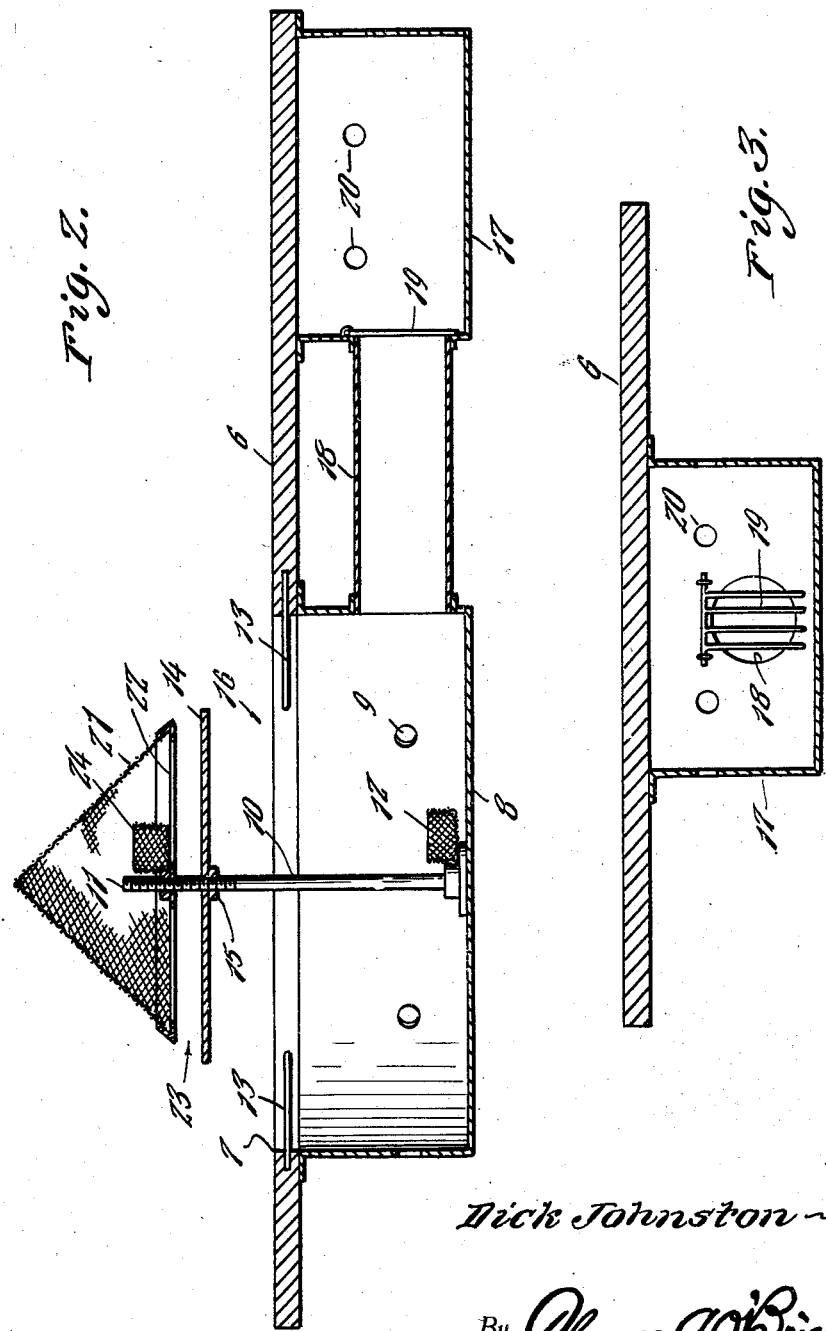

Patented Jan. 28, 1930

1,744,901

UNITED STATES PATENT OFFICE

DICK JOHNSTON, OF BUFFALO, WYOMING

ANIMAL TRAP

Application filed May 13, 1929. Serial No. 362,631.

This invention relates to an improved animal trap especially but not necessarily constructed for trapping fur bearing animals of various species, both dry land and water animals.

Broadly stated, the invention has reference to a structure which includes a support and interconnected enclosures one of which may be distinguished as an entrapping casing and the other one of which is a storage casing.

The principal improvement resides in the provision of novel means for facilitating entrance of the animals into the trapping chamber, but preventing escape by climbing or jumping out.

The particular details and their relative association and arrangement for accomplishing the improved results will become more readily apparent from the following description and drawings.

In the drawings:

Figure 1 is a top plan view of a trap constructed in accordance with the present invention.

Figure 2 is a longitudinal sectional view on an enlarged scale taken approximately upon the plane of the line 2—2 of Figure 1.

Figure 3 is a transverse section taken on the line 3—3 of Figure 2.

Figure 4 is a top plan view of an auxiliary bait cage or appliance.

Figure 5 is a perspective view of an adjustable cover plate or disc constituting an important part of the entrance and guard means of the main trap casing.

The entire assembly of details may well be seen in Figure 2. In this figure the reference character 6 designates a board or the like of appropriate shape and proportion. I prefer to employ a board because it is desirable because of its buoyant properties and further desirable in that the present trap is intended under many conditions, to be submerged for trapping water animals. Suspended from the under side of this board and registering with the entrance opening or hole 7 is a metallic cup shaped receptacle 8 which functions as the main trapping casing or chamber. This is provided with openings 9 to facilitate passage of water when the trap is submerged in the water. Rising from the bottom and extending through the opening 7 is a standard 10 whose upper end is screw threaded as indicated at 11. At the bottom of this standard and within the casing 8 is a bait box or receptacle 12 appropriately made to facilitate the application and removal of bait. Surrounding and extending into the opening 7 are horizontal pointed guard fingers or wires 13. These are arranged in a circular row as is observed from Figure 1, the pointed ends being disposed inwardly. The purpose of these wires is to permit entrance of the animals but to prevent them from jumping up and out without damage and injury. Overlying the central portion of the opening 7 and extending slightly over the pointed ends of the guard fingers 13 is a cover disc or plate 14. This is provided with a hub nut 15 adjustable on the screw threaded end of the standard 10. This defines an annular space 16 between itself and the fingers for permitting entrance of the animals.

The casing 8 is connected with the storage casing 17 by way of a tubular passage 18. At the discharge end of the passage 18 is a gridlike hingedly mounted door 19. This is opened when the animal pushes against it. This casing 17 is also provided with water holes 20.

Under some instances it is desirable to employ an additional bait cage. I prefer to provide a conical wire cage 21 having a spider 22 the inner ends of the arms of which are adjustably mounted on the screw threaded portion 11 of the standard 10 at a point above the plate 14. This defines a restricted annular space at 23. Mounted in this cage is a bait receptacle 24 for initially inticing animals to the trap.

The trap is used either on the land or in the water as desired. When used in the water the board 6 constitutes a float for suspending it and appropriate anchoring means is of course provided. The animals are enticed by the bait in the receptacle 24 but concealed by the conical shield or cage 21. The animals smell the bait but cannot enter this space by way of the restricted space 23. Therefore they smell the bait in the receptacle 12. Following the course of least resistance they then pass through the space 16 and jump down into the casing 8. They are then trapped and find it difficult if not impossible to jump out without injury or destruction. Consequently, the entrapped animal passes through the tubular passage 18, pushes the door 19 open and finds itself confined in the storage chamber 17 from which subsequent removal is made.

It is understood that the cone like shield 21 is not an essential part of the invention and is employed only under desirable conditions.

While I have shown the preferred embodiment of my invention it is to be understood that minor changes in the size, shape and arrangement of parts may be resorted to without departing from the spirit of the invention and the scope of the appended claims.

Having thus described the invention, what I claim as new and desire to secure by Letters Patent is:—

1. In a trap, a float forming board having a circular opening formed therein, a cup like receptacle suspended from the under side of said board and in registry with said opening, said receptacle constituting a trap casing, a second casing suspended from the under side of said board, a tubular passage connecting said casings together and including an animal actuated trap door leading into said second casing, both of said casings being formed with water holes, a plurality of circumferentially spaced guard fingers arranged to project into the opening in said board and overlying the mouth of said receptacle, a standard mounted in and rising through the open top of the receptacle and opening in said board, the upper end of said standard being screw threaded, and a disc adjustably mounted on the screw threaded end portion of said standard, said disc having a peripheral portion overlying the pointed inner ends of said fingers in vertically spaced relation and defining an annular animal entrance space.

2. In a trap, a float forming board having a circular opening formed therein, a cup like receptacle suspended from the under side of said board and in registry with said opening, said receptacle constituting a trap casing, a second casing suspended from the under side of said board, a tubular passage connecting said casings together and including an animal actuated trap door leading into said second casing, both of said casings being formed with water holes, a plurality of circumferentially spaced guard fingers arranged to project into the opening in said board and overlying the mouth of said receptacle, a standard mounted in and rising through the open top of the receptacle and opening in said board, the upper end of said standard being screw threaded, a disc adjustably mounted on the screw threaded end portion of said standard, said disc having a peripheral portion overlying the pointed inner ends of said fingers in vertically spaced relation and defining an annular animal entrance space, a bait receptacle in said animal casing, together with an auxiliary bait receptacle and foraminous shield adjustably mounted on the upper screw threaded end portion of said standard in spaced relation above said disc.

In testimony whereof I affix my signature.

DICK JOHNSTON.